United States Patent
Alexander

(10) Patent No.: US 12,509,407 B2
(45) Date of Patent: Dec. 30, 2025

(54) BIOSTIMULANT AGENT FOR TREATING PLANTS AND/OR PLANT SEED

(71) Applicant: UNIFERX INTERNATIONAL GMBH, Ostseebad Nienhagen (DE)

(72) Inventor: Alvin Alexander, Duesseldorf (DE)

(73) Assignee: Uniferx International GmbH, Ostseebad Nienhagen (DE)

( * ) Notice: Subject to any disclaimer, the term of this patent is extended or adjusted under 35 U.S.C. 154(b) by 737 days.

(21) Appl. No.: 17/753,196

(22) PCT Filed: Aug. 28, 2020

(86) PCT No.: PCT/DE2020/100764
§ 371 (c)(1),
(2) Date: Feb. 23, 2022

(87) PCT Pub. No.: WO2021/037314
PCT Pub. Date: Mar. 4, 2021

(65) Prior Publication Data
US 2022/0274893 A1 Sep. 1, 2022

(30) Foreign Application Priority Data
Aug. 31, 2019 (DE) ...................... 10 2019 123 387.9

(51) Int. Cl.
*C05G 5/23* (2020.01)
*C05C 11/00* (2006.01)

(52) U.S. Cl.
CPC ................ *C05G 5/23* (2020.02); *C05C 11/00* (2013.01)

(58) Field of Classification Search
CPC .................................. C05G 5/23; C05C 11/00
See application file for complete search history.

(56) References Cited

U.S. PATENT DOCUMENTS

| | | | | |
|---|---|---|---|---|
| 9,980,489 | B2 * | 5/2018 | Roose | C05D 9/00 |
| 2013/0130902 | A1 | 5/2013 | Roose et al. | |
| 2020/0260721 | A1 * | 8/2020 | Lopez | C05G 5/12 |

FOREIGN PATENT DOCUMENTS

| | | |
|---|---|---|
| CN | 104337701 A | 2/2015 |
| CN | 106137826 A | 11/2016 |
| CN | 108670896 A | 10/2018 |
| CN | 109833274 A | 6/2019 |
| CN | 110054534 A | 7/2019 |
| DE | 2808365 | 8/1979 |
| DE | 60101466 | 12/2004 |
| EP | 1269847 | 1/2003 |
| EP | 2371220 | 10/2011 |
| EP | 2735232 | 5/2014 |
| RU | 2537194 C1 | 12/2014 |
| UZ | 4584 C | 11/2012 |
| WO | 02/102302 | 12/2002 |

OTHER PUBLICATIONS

Qazi et al. (Dissecting the Role of Glycine Betaine in Plants Under Abiotic Stress), Plant Stress, 2013 Global Science Books.*
Colla et al. (Biostimulant Action of Protein Hydrolysate: Unraveling Their Effects on Plant Physiology and Microbiome), Frontiers in Plant Science,2013.*
Blunden et al., "Enhanced leaf chlorophyll levels in plants treated with seaweed extract", Journal of Applied Phycology, vol. 8, 1997, pp. 535-543.
International Search Report issued Nov. 2, 2020 in PCT/DE2020/100764, with English translation, 7 pages.
Written Opinion issued Nov. 2, 2020 in PCT/DE2020/100764, with English translation, 15 pages.
Xie et al., "Research progress of plant biostimulants", Chinese Journal of Biological Control, vol. 35, No. 3, Jun. 30, 2019, pp. 487-496, (with English Abstract and partial English translation).
Giuseppe Colla et al., "Protein hydrolysates as biostimulants in horticulture", Scientia Horticulturae, 196, Elsevier B. V., 2015, pp. 28-38.
Hubert Olbrich, "The Molasses", published online under http://www.btkempe.de/Molasses_OLBRICH.pdf (downloaded Jul. 10, 2025), 2006, Biotechnology-Kempe GmbH, Berlin, Germany, 131 pages.

* cited by examiner

*Primary Examiner* — Zohreh A Fay
(74) *Attorney, Agent, or Firm* — Grüneberg and Myers PLLC

(57) ABSTRACT

A biostimulant agent is useful for the treatment of plants and/or plant seed with a protein hydrolysate proportion and a betaine proportion in a mass ratio of 10:1 to 1:10. A composition with a protein hydrolysate proportion and a betaine proportion in a mass ratio of 10:1 to 1:10 can be provided as a biostimulant agent for the treatment of plants and/or plant seed.

16 Claims, 3 Drawing Sheets

BIOSTIMULANT AGENT FOR TREATING PLANTS AND/OR PLANT SEED

CROSS-REFERENCE TO RELATED APPLICATIONS

This application is the National Stage entry under § 371 of International Application No. PCT/DE2020/100764, filed on Aug. 28, 2020, and which claims the benefit of German Application No. 10 2019 123 387.9, filed on Aug. 31, 2019. The content of each of these applications is hereby incorporated by reference in its entirety.

FIELD OF THE INVENTION

The invention relates to a biostimulant agent for treating plants and/or plant seed, comprising a protein hydrolysate proportion and a betaine proportion.

The invention further relates to a method for treating plants and/or plant seed with such a biostimulant agent.

The invention further relates to the use of a composition comprising a protein hydrolysate proportion and a betaine proportion as a biostimulant agent for treating' plants and/or plant seed.

DESCRIPTION OF THE RELATED ART

Biostimulant agents are usually applied to plants or in the rhizosphere to stimulate natural processes and in this way improve nutrient uptake, nutrient efficiency, tolerance to abiotic stress and plant quality.

From EP 2 735 232 A1, a biostimulant agent is known which, in addition to 79.3 to 83.4% hydrolyzed algal protein, also contains 2.0% to 2.1% betaine. However, this biostimulant shows little or no improved effect under stress conditions such as drought stress compared to a standard product. In. EP 2 735 232 A1, selenium is therefore additionally added to the biostimulant mixture. This selenium addition can lead to an improvement in the response of the plants to drought stress, in particular to improved fruit production by the plants.

However, the use of selenium is associated with a number of disadvantages. Although selenium is an essential trace element for humans in the smallest amounts, selenium has a toxic effect when ingested in excess of the necessary amount. This is problematic because plant treatment with the composition proposed in EP 2 735 232 A1 has been shown to significantly increase the selenium content in the edible portion of treated plants. Higher selenium concentrations also have a toxic effect on honeybees and other insects.

SUMMARY OF THE INVENTION

It is therefore an object of the present invention to provide an improved biostimulant agent. In particular, it is an object of the present invention to provide a biostimulant agent with reduced toxicity.

DETAILED DESCRIPTION OF THE INVENTION

Figure 1:
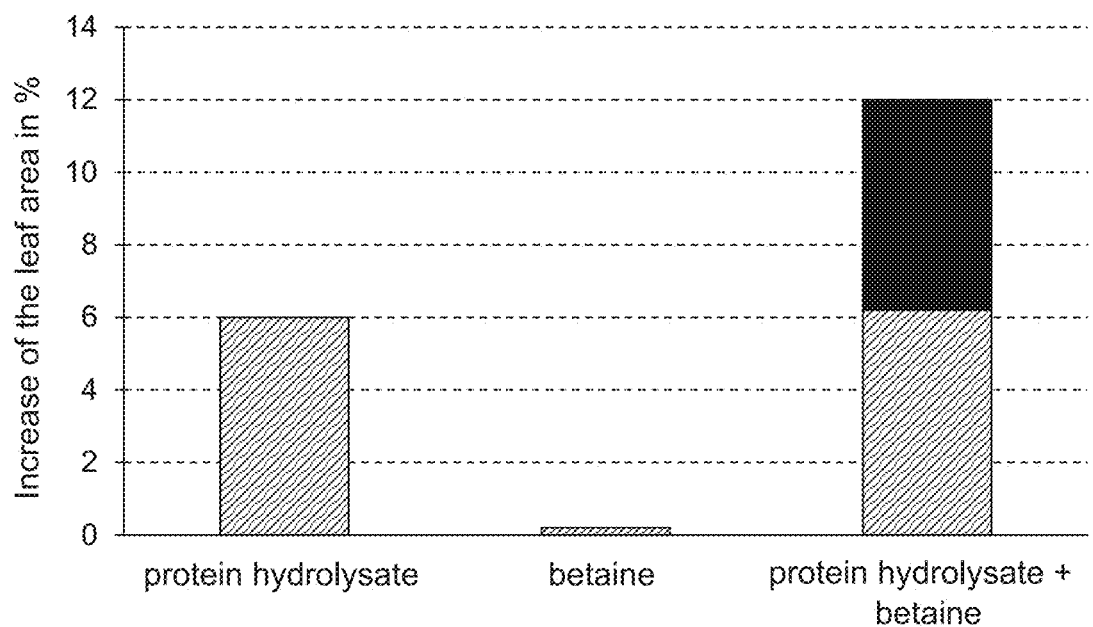
FIG. 1 shows a bar chart showing the result of a first comparative test performed with the biostimulant agent according to the invention.

This problem is solved at least by the protein hydrolysate proportion and the betaine proportion are present in relation to one another in a mass ratio of 10:1 to 1:10 in the biostimulant agent.

Preferred embodiments are provided in the following description.

A method for treating plants and/or plant seed with a biostimulant agent according to the invention is the subject of a further embodiment.

Another embodiment is directed to the use of a composition comprising a protein hydrolysate proportion and a betaine proportion, wherein the protein hydrolysate proportion and the betaine proportion are contained in relation to one another in a mass ratio of 10:1 to 1:10 in the composition, as biostimulant agent for treating plants and/or plant seed.

The invention is based on the surprising finding that the combined use of a protein hydrolysate and at least one betaine compound in a biostimulant agent has a positive synergistic effect with respect to stress resistance of the plants or the plant seed, respectively, treated with this agent, provided that the protein hydrolysate proportion and the betaine proportion are used in the ratio according to the invention. As a result, the plants treated with the biostimulant agent according to the invention or the plants subsequently produced from the treated plant seed exhibit significantly improved growth and higher yield. The experiments described in the following embodiments illustrate this synergistic effect created by the present invention.

Since the use of protein hydrolysate and the at least one betaine compound in the ratio according to the invention alone significantly improves the stress resistance of the plant seed or plants, respectively, treated with the invention, the selenium additive known from the prior art can, for example, be dispensed with in the invention. Accordingly, in preferred embodiments, no selenium is present in the biostimulant agent. In this way, the toxic effects of selenium on humans and the environment can be completely avoided.

With regard to the mass ratio of the protein hydrolysate proportion and the betaine proportion in relation to one another according to the invention, the respective ratios are indicated in the context of this application in such a way that the protein hydrolysate proportion precedes the betaine proportion. Accordingly, for example, the indication "10:1" for the mass ratio means that the mass proportion of the protein hydrolysate proportion in the biostimulant agent is greater by a factor of 10 compared to the mass proportion of the betaine proportion.

In the biostimulant agent according to the invention, the protein hydrolysate proportion and the betaine proportion can be present in relation to one another, for example in a mass ratio of at least 10:1, at least 9:1, at least 8:1, at least 7:1, at least 6:1, at least s:1, at least 4:1, at least 3:1, at least 2:1, at least 1:1, at least 1:2, at least 1:3, at least 1:4, at least 1:5, at least 1:6, at least 1:7, at least 1:8, at least 1:9 or at least 1:10.

Alternatively or in addition thereto, in the biostimulant agent according to the invention, the protein hydrolysate proportion and the betaine proportion can also be present in relation to one another in a mass ratio of at most 10:1, at most 9:1, at most 8:1, at most 7:1, at most 6:1, at most 5:1, at most 4:1, at most 3:1, at most 2:1, at most 1:1, at most 1:2, at most 1:3, at most 1:4, at most 1:5, at most 1:6, at most 1:7, at most 1:8, at most 1:9 or at most 1:10.

In preferred embodiments of the invention, it is provided that the protein hydrolysate proportion and the betaine proportion are present in relation to one another in a mass ratio of 3:1 to 1:10, 3:1 to 1:5 or 1:1 to 1:3 in the biostimulant agent. The inventors have recognized that within these ratios the combinatorial effect of the protein hydrolysate proportion and the betaine proportion is particularly distinct and the biostimulant agent accordingly exerts a particularly good effect.

As the term is used herein, a "protein hydrolysate" is a mixture which may contain or consist of, inter alia various free amino acids, oligopeptides, polypeptides and/or other products resulting from protein hydrolysis in any combination. Suitable protein hydrolysates are obtainable, for example, by partial or complete enzymatic and/or chemical hydrolysis of one or more protein sources, such as gelatin, wherein the composition of the protein hydrolysate may typically vary depending on the manufacturing process and the protein source. Naturally, the protein hydrolysate proportion may also contain the products of several different protein hydrolyses.

The betaine proportion may contain or consist of a single betaine compound or several different betaine compounds. In a preferred embodiment, it is provided that the betaine proportion comprises glycine betaine, that is at least one of the betaine compounds contained in the biostimulant agent is glycine betaine. It is also possible that the betaine proportion consists of glycine betaine, that is the biostimulant agent contains glycine betaine as the only betaine compound.

The formulation of the biostimulant agent according to the invention for treating plants and/or plant seed is not particularly limited. The biostimulant agent may, for example, be a gaseous and/or liquid and/or solid, homogeneous or heterogeneous mixture. In this context, a suitable heterogeneous mixture is, for example, an emulsion, in particular in the form of a paste, a suspension, a conglomerate or an aerosol. A homogeneous mixture may in particular be a gas mixture or a solution. A preferred conglomerate is, for example, a granulate, in particular a powder.

Formulations of the biostimulant agent containing one or more solids can for the treatment of the plants, for example, be added to or mixed with the soil in which the plants are growing. This allows the biostimulant agent to affect the plants, which can take it up from the rhizosphere located around the root.

Preferably, the biostimulant agent is present in an at least partially liquid formulation, in particular in the form of a liquid homogeneous mixture. In this way, the agent can be applied particularly easily and uniformly to the plants, in particular to the leaves or to the plant seed, respectively, and/or to or into the soil. At the same time, the biostimulant effect can usually unfold much faster compared to a solid, so that short-term or acute applications of the agent are also possible. Insofar as the biostimulant agent contains or consists of one or more solids, it is advantageous if it is soluble in a solvent. A preferred solvent for the biostimulant agent is water or an aqueous liquid, respectively.

In a further preferred embodiment of the invention, it is provided that the protein hydrolysate proportion comprises or consists of a hydrolysis product of collagen. For biostimulant agents according to the invent on comprising hydrolysis products of collagen, the inventors have been able to determine a particularly advantageous biostimulatory effect. A further advantage is that collagen is contained, for example, in animal leather, skin and bone remains and is accrued in large quantities as a waste product. Thereby, the biostimulant agent can also be produced particularly cost effectively.

In general, it is advantageous in the present invention if the protein hydrolysate proportion comprises at least in part or completely a hydrolysis product of animal and/or plant origin. For example, the protein hydrolysate proportion may be at least in part or completely a hydrolysis product from the hydrolysis of animal remains, in particular leather remains, such as cowhide remains, and/or a hydrolysis product from the hydrolysis of legume proteins. Preferably, the protein hydrolysate proportion does not contain a hydrolysis product derived from an alga. For the production of the biostimulant agent according to the invention, protein hydrolysates containing, for example, 0.1 to 60 weight percent of free amino acids may be used. In the case of liquid formulations, the proportion of free amino acids may be, for example, 0.1 to 30 weight percent with respect to the fresh weight of the protein hydrolysate. A protein hydrolysate preferred for preparation in powder or granular form may contain, for example, 0.2 to 60 weight percent of free amino acids with respect to dry weight. The protein hydrolysates may comprise a total amino acid content from 40 to 80 weight percent, preferably from 50 to 60 weight percent.

In a further preferred. embodiment of the invention, the biostimulant additionally contains at least one additive selected from a fungicide, an insecticide and/or a herbicide. Such combinations according to the invention have proven to be particularly advantageous, since the plants or plant seed, respectively, are generally more resistant to the stress effect caused by the additive due to the high biostimulatory effect, and thus, for example, a negative effect of herbicide stress on the plants or plant seed, respectively, can be attenuated or avoided. In this way, the biostimulant agent according to the invention enables a particularly effective and, moreover, particularly economical plant protection treatment, since separate work steps for applying The additive to the plants and/or the plant seed are no longer required.

Alternatively or additionally, the additive may comprise a plant-specific growth regulator. Plant-specific growth regulators can be, for example, cytokines, cytokinins, ethene and/or phytohormones such as abscisic acid, gibberellins and/or auxins. As a result, the biostimulant agent according to the invention achieves a particularly advantageous plant growth or seed development, respectively.

According to another preferred embodiment of the invention, the biostimulant agent comprises a solvent. A particularly preferred solvent is water. Such solvent-containing biostimulant agents can be used in a particularly simple and controlled manner to treat the plants and/or the plant seed. For example, the treatment of the plants and/or the plant seed can be combined directly with routine irrigation, which simplifies the application of the biostimulant agent and saves work steps. In addition, the plants or plant seed can generally also absorb a solvent-containing biostimulant agent better and faster, so that the positive effects of the invention already described, in particular the improved stress resistance, also take effect more quickly and effectively in the plants or plant seed. In addition, for example, via the amount of solvent, the concentration of the active components of the biostimulant agent required for the particular application can be adjusted particularly easily and dosed uniformly.

In embodiments in which the biostimulant agent comprises a solvent or is present as a solution, respectively, preferably the protein hydrolysate proportion and the betaine proportion form together a total proportion from 0.01 weight percent to 80 weight percent, preferably from 30 weight percent to 80 weight percent, more preferably from 45 weight percent to 75 weight percent of the biostimulant agent. It is also possible that the protein hydrolysate proportion and the betaine proportion are together contained in a concentration from 0.1 grams per liter to 800 grams per liter, preferably 300 grams per liter to 800 grams per liter, particularly preferably 450 grams per liter to 750 grams per liter in the biostimulant agent.

In general, in the present invention the protein hydrolysate proportion and the betaine proportion may form together a total proportion of at least 0.01 weight percent, at least 0.1 weight percent, at least 0.5 weight percent, at least 1 weight percent, at least 2 weight percent, at least 3 weight percent, at least 4 weight percent, at least 5 weight percent, at least 6 weight percent, at least 7 weight percent, at least 8 weight percent, at least 9 weight percent, at least 10 weight percent, at least 15 weight percent, at least 20 weight percent, at least 25 weight percent, at least 30 weight percent, at least 35 weight percent, at least 40 weight percent, at least 45 weight percent, at least 50 weight percent, at least 55 weight percent, at least 60 weight percent, at least 65 weight percent, at least 70 weight percent, at least 75 weight percent, at least 80 weight percent, at least 85 weight percent, at least 90 weight percent, at least 95 weight percent, at least 98 weight percent or 100 weight percent of the biostimulant agent.

Alternatively or additionally, the protein hydrolysate proportion and the betaine proportion may form together a total proportion of at most 0.01 weight percent, at most 0.1 weight percent, at most 0.5 weight percent, at most 1 weight percent, at most 2 weight percent, at most 3 weight percent, at most 4 weight percent, at most 5 weight percent, at most 6 weight percent, at most 7 weight percent, at most 8 weight percent, at most 9 weight percent, at most 10 weight percent, at most 15 weight percent, at most 20 weight percent, at most 25 weight percent, at most 30 weight percent, at most 35 weight percent, at most 40 weight percent, at most 45 weight percent, at most 50 weight percent, at most 55 weight percent, at most 60 weight percent, at most 65 weight percent, at most 70 weight percent, at most 75 weight percent, at most 80 weight percent, at most 85 weight percent, at most 90 weight percent, at most 95 weight percent, at most 98 weight percent or at most 100 weight percent of the biostimulant agent.

In yet other preferred embodiments, the protein hydrolysate proportion and the betaine proportion may also be contained together in a total concentration of at least 0.1 grams per liter, at least 0.25 grams per liter, at least 0.5 grams per liter, at least 1 gram per liter, at least 5 grams per liter, at least 10 grams per liter, at least 20 grams per liter, at least 30 grams per liter, at least 40 grams per liter, at least 50 grams per 1 liter, at least 60 grams per liter, at least 70 grams per liter, at least 80 grams per liter, at least 90 grams per liter, at least 100 grams per liter, at least 200 grams per liter, at least 300 grams per liter, at least 400 grams per liter, at least 500 grams per liter, at least 600 grams per liter, at least 700 grams per liter, at least 800 grams per liter, at least 900 grams per liter or at least 1000 grams per liter in the biostimulant agent.

Additionally or alternatively, the protein hydrolysate proportion and the betaine proportion may also be contained together in a total concentration of at most 0.1 grams per liter, at most 0.25 grams per liter, at most 0.5 grams per liter, at most 1 gram per liter, at most 5 grams per liter, at most 10 grams per liter, at most 20 grams per liter, at most 30 grams per liter, at most 40 grams per liter, at most 50 grams per liter, at most 60 grams per liter, at most 70 grams per liter, at most 80 grams per liter, at most 90 grams per liter, at most 100 grams per liter, at most 200 grams per liter, at most 300 grams per liter, at most 400 grams per liter, at most 500 grams per liter, at most 600 grams per liter, at most 700 grams per liter, at most 800 grams per liter, at most 900 grams per liter or at most 1000 grams per liter in the biostimulant agent.

In a further preferred embodiment of the invention, it is moreover provided, that the biostimulant agent additionally comprises a wetting agent. In this was an improved and, in particular, more uniform wetting of the plants or plant seed with the biostimulant agent is achieved and at the same time the absorption rate at which the biostimulant agent is absorbed, e.g. via the plant leaves, into the plants is increased.

The wetting agent can in particular form a wetting agent proportion of 0.01 weight percent to 5.0 weight percent of the biostimulant agent and/or be contained in the biostimulant agent in a concentration of 0.01 volume percent to 5.0 volume percent. Within these ranges, good wetting properties and high absorption rates of the biostimulant agent can be advantageously combined.

The wetting agent is preferably a non-ionic surfactant. Particularly preferably, the wetting agent is a fatty alcohol ethoxylate, a fatty amine ethoxylate, a fatty alcohol propoxylate, a fatty alcohol ethoxypropoxylate, or any combination thereof. These surfactants are advantageous because they are characterized by low foam formation and are particularly effective in preventing the foam formation that is promoted by the protein hydrolysate, especially when the biostimulant agent is diluted.

Preferably, the wetting agent is contained in the biostimulant agent in a wetting agent proportion of at least 0.01 weight percent, at least 0.1 weight percent, at least 0.5 weight percent, at least 1.0 weight percent, at least 2.0 weight percent, at least 3.0 weight percent, at least 4.0 weight percent or at least 5.0 weight percent.

Additionally or alternatively, the wetting agent may also be contained in the biostimulant agent in a wetting agent proportion of at most 0.01 weight percent, at most 0.1 weight percent, at most 0.5 weight percent, at most 1.0 weight percent, at most 2.0 weight percent, at most 3.0 weight percent, at most 4.0 weight percent or at most 5.0 weight percent.

In other embodiments the wetting agent may be contained in the biostimulant agent in a concentration of at least 0.01 volume percent, at least 0.1 volume percent, at least 0.5 volume percent, at least 1.0 volume percent, at least 2.0 volume percent, at least 3.0 volume percent, at least 4.0 volume percent. or at least 5.0 volume percent.

Additionally or alternatively the wetting agent may also be contained in the biostimulant agent in a concentration of at most 0.01 volume percent, at most 0.1 volume percent, at most 0.5 volume percent, at most 1.0 volume percent, at most 2.0 volume percent, at most 3.0 volume percent, at most 4.0 volume percent or at most 5.0 volume percent.

The pH of the biostimulant agent can be adjusted in a known manner with suitable bases and/or acids. Preferably, the biostimulant agent contains citric acid and/or a salt thereof, such as citric acid trisodium salt, for regulating the pH, in particular in a proportion of 1.0 to 10 weight percent or 3.0 to 5.0 weight percent with respect to the total mass of the biostimulant agent.

Another aspect of the invention relates to a method for treating plants and/or plant seed, wherein the treatment is performed with the biostimulant agent according to the invention.

In a preferred embodiment of the method, the treatment comprises contacting at least a part of the plants and/or plant seed with the biostimulant agent. Preferably, the plant part comprises one or more leaves of the plant. In particular, the biostimulant agent can be applied to the plant part and/or the plant seed by means of a spraying method, for example in the form of a solution, an aerosol, and/or as a gas mixture.

In the case of the treatment of plant seed, these are preferably placed into the biostimulant agent and/or washed around by it before the sowing process. For this purpose, the biostimulant agent may once again be present in the form of a solution, an aerosol, preferably in the form of a nebula, and/or as a gas mixture. In a preferred method embodiment, the plant seed is incubated in an aerated aqueous solution with a concentration of the biostimulant agent between 0.01 weight percent and 5.0 weight percent. In this way, a particularly effective germination promotion of the seed is achieved under stress conditions such as cold stress.

In a further preferred embodiment of the method according to the invention, it is provided that the plants and/or the plant seed are brought into contact with the biostimulant mixture for at least 10 hours and/or for at most 14 hours. It has been found that at these contact durations with the biostimulant mixture, the greatest improvements are achieved with regard to the stress resistance of the plants and/or the plant seed.

An advantageous effect of the biostimulant mixture is of course also achieved with shorter or longer contact times. In certain method embodiments, the plants and/or plant seed are brought into contact with the biostimulant mixture for at least 1 hour, at least 2 hours, at least 3 hours, at least 4 hours, at least 5 hours, at least 6 hours, at least 7 hours, at least 8 hours, at least 9 hours, at least 10 hours, at least 11 hours, at least 12 hours, at least 13 hours, at least 14 hours, at least 15 hours, at least 16 hours, at least 17 hours, at least 18 hours, at least 19 hours, at least 20 hours, at least 24 hours, at least 36 hours, at least 48 hours or at least 72 hours.

Additionally or alternatively, the plants and/or plant seed may be brought into contact with the biostimulant mixture for at most 1 hour, at most 2 hours, at most 3 hours, at most 4 hours, at most 5 hours, at most 6 hours, at most 7 hours, at most 8 hours, at most 9 hours, at most 10 hours, at most 11 hours, at most 12 hours, at most 13 hours, at most 14 hours, at most 15 hours, at most 16 hours, at most 17 hours, at most 18 hours, at most 19 hours, at most 20 hours, at most 24 hours, at most 36 hours, at most 48 hours or at most 72 hours.

In preferred embodiments of the method, it is provided that the treatment with the biostimulant is performed before a stress event for the plants and/or the plant seed. In this way, the stimulant function is caused to develop effect at least partially or completely by the time the stress event occurs, and a reliable improvement in stress resistance is ensured. In other words, the plants or the plant seed are thus prepared for a planned and/or expected stress event by already improving the stress resistance in advance of the stress event by the treatment with the biostimulant agent according to the invention. In addition or as an alternative to the treatment before a stress event, the treatment with the biostimulant agent can also be performed after a stress event for the plants and/or the plant seeds. Surprisingly, it has been found that even those plants that have already been damaged by a stress event can be largely revitalized again by treatment with the biostimulant agent according to the invention. In this way, crop losses can be significantly reduced even, for example, after an unforeseen heat or drought period.

The inventors have found that the method according to the invention is suitable for improving the tolerance of plants or plant seed to a wide variety of abiotic and biotic stress events. In particular, the stress event may be a cold stress, a heat stress, a drought stress, and/or a salt stress. In particular, a cold stress may involve exposing the plants or plant seed to a temperature below 10° C. or below 8° C. for several successive days. In particular, subtropical and tropical plants may be exposed to cold stress even at temperatures below 10° C. In the case of heat stress, for example, plants are exposed to temperatures above 30° C. for several successive days. In general, plants are exposed to drought stress if they have too insufficient water available. Reasons for this can be soil drought, soil frost, osmotic water retention, or insufficient expansion of the root system. An example of drought stress is soil moisture less than 50% or less than 30% of the usable field capacity (% nFK).

The stress event can also be an herbicide, fungicide, and/or insecticide treatment, which are also typically associated with stress to the plant. In particular, herbicide applications sometimes cause significant stress to the useful plant, such that even selective herbicides can reduce productivity of the plants. For example, even the application of selective sugar beet herbicides usually leads to a significant reduction in sugar yield. The method according to the invention effectively and reliably counteracts these stress effects.

In this context, the herbicide, fungicide and/or insecticide treatment are examples of a plannable stress event. An expected stress event can be predicted, for example, using weather data, in particular with the aid of precipitation and/or temperature forecasts. The respective parameters characterizing a stress event, such as temperature patterns, the water retention capacity and/or salt concentration of the soil, precipitation patterns, air humidity patterns and the like are sufficiently known to the skilled person for the respective plant species or plant varieties, respectively.

In preferred embodiments of the method according to the invention, the treatment is performed between 24 and 48 hours before the stress event. This is advantageous because it provides sufficient time for the uptake and metabolism of the biostimulant agent by the plants or plant seed and accordingly leads to a particularly pronounced and reliable improvement in stress resistance.

In further advantageous method embodiments, the treatment is performed at least 1 hour, at least 2 hours, at least 3 hours, at least 4 hours, at least 5 hours, at least 6 hours, at least 7 hours, at least 8 hours, at least 9 hours, at least 10 hours, at least li hours, at least 12 hours, at least 13 hours, at least 14 hours, at least 15 hours, at least 16 hours, at least 17 hours, at least 10 hours, at least 19 hours, at least 20 hours, at least 24 hours, at least 36 hours, at least 48 hours, or at least 72 hours before and/or after the stress event.

In addition or alternatively, the treatment may be performed at most 1 hour, at most 2 hours, at most 3 hours, at most 4 hours, at most 5 hours, at most 6 hours, at most 7 hours, at most 8 hours, at most 9 hours, at most 10 hours, at most 11 hours, at most 12 hours, at most 13 hours, at most 14 hours, at most 15 hours, at most 16 hours, at most 17 hours, at most 18 hours, at most 19 hours, at most 20 hours, at most 24 hours, at most 36 hours, at most 48 hours, or at most 72 hours before and/or after the stress event.

The method according to the invention can in principle be used in the treatment of all known plant species or plant varieties and/or their plant seeds, for example, in the case of arable plants, garden plants, ornamental plants, grasses, trees, shrubs and/or lawns. Preferably, the method according to the invention comprises the treatment of one or more of the following plant species or plant varieties respectively and/or their plant seed: cereals, corn, wheat, barley, rye, rice, sunflowers, oil plants, canola, soybeans, cotton plants, potatoes, fruits, vegetables, beans, broccoli, cabbage, carrots, cauliflower, cucumbers, eggplants, lettuce, melons, watermelons, onions, peas, spice plants, herbs, pepper, spinach, tomatoes and/or tea.

It goes without saying that the method according to the invention and/or the biostimulant agent according to the invention can In principle be used to treat a single plant. Such applications are particularly intended in the field of ornamental plants. Preferably, however, the method and/or the biostimulant agent is applied to a large number of plants and is used in particular on a large agricultural scale. In preferred method embodiments, the biostimulant agent is applied such that the mass of the protein hydrolysate proportion and the mass of the betaine proportion together equals 1 gram to 5000 grams per hectare of a treatment area comprising the plants and/or the plant seed. Preferably, the biostimulant agent is applied in a volume of 50 to 1500 liters per hectare, especially for foliar application. For the treatment of plant seed, a biostimulant agent according to the invention is preferably used, in which the protein hydrolysate proportion and the betaine proportion are contained together in a total concentration of 20 grams per liter to 50 grams per liter. In addition or alternatively, for example, 100 milliliters to 200 milliliters of the biostimulant agent can be used per 100 kilograms of seed. The seed in this case may be, for example, a cereal seed. Within these ranges, the inventors have found a particularly advantageous correlation between the applied dose of the biostimulant agent and the resulting effect on the plants or seeds respectively, so that the method is particularly efficient. In this context, the treatment. area can be, for example, an agricultural area such as a field on which the plants grow, for example in a monoculture.

In general the biostimulant agent may be used in a volume of at least 0.001 milliliter, at least 0.01 milliliter, at least 0.1 milliliter, at least 1 milliliter, at least 0.01 liter, at least 0.1 liter, at least 0.5 liter, at least 1 liter, at least 5 liters, at least 10 liters, at least 25 liters, at least 50 liters, at least 100 liters, at least 200 liters, at least 300 liters, at least 400 liters, at least 500 liters, at least 750 liters, at least 1000 liters, at least 1500 liters, at least 2000 liters, at least 2500 liters, at least 3000 liters, at least 4000 liters or at least 5000 liters for the treatment of the plants or of the plant seed. These volume specifications may apply, for example, per hectare of a treatment area containing the plants and/or the plant seed and/or per 100 kilograms of the seed or plants, respectively, to be treated and/or—e.g. in the ornamental plant sector—per individual plant to be treated.

Additionally or alternatively, the biostimulant agent may be used in a volume of at most 0.001 milliliter, at most 0.01 milliliter, at most 0.1 milliliter, at most 1 milliliter, at most 0.01 liter, at most 0.1 liter, at most 0.5 liter, at most 1 liter, at most 5 liters, at most 10 liters, at most 25 liters, at most 50 liters, at most 100 liters, at most 200 liters, at most 300 liters, at most 400 liters, at most 500 liters, at most 750 liters, at most 1000 liters, at most 1500 liters, at most 2000 liters, at most 2500 liters, at most 3000 liters, at most 4000 liters or at most 5000 liters for the treatment of the plants and/or the plant seed. Here, too, these volume specifications can apply, for example, per hectare of a treatment area containing the plants and/or the plant seed and/or per 100 kilograms of the seed or plants, respectively, to be treated and/or—e.g. in the ornamental plant sector—per individual plant to be treated.

Finally, the invention relates to a use of a composition comprising a protein hydrolysate proportion and a betaine proportion, wherein the protein hydrolysate proportion and the betaine proportion are contained in relation to one another in a mass ratio of 10:1 to 1:10 in the composition, as a biostimulant agent for treating plants and/or plant seed.

The explanations and disclosures relating to an item according to the invention also apply mutatis mutandis to all further items according to the invention, provided that these do not contradict the specific explanations and disclosures of the further items according to the invention. For example, the explanations and disclosures relating to the biostimulant agent according to the invention also apply mutatis mutandis to the method or use, respectively, according to the invention, and vice versa, provided that they do not contradict the specific explanations and disclosures made in connection with the method, use or biostimulant agent, respectively, according to the invention.

Further features and advantages of the invention will be apparent from the following specific description and the drawings.

BRIEF DESCRIPTION OF THE FIGURES

It show:

FIG. 1:

A bar chart showing the result of a first comparative test performed with the biostimulant agent according to the invention.

FIG. 2:

A bar chart showing the result of a second comparative test performed with the biostimulant agent according to the invention.

FIG. 3:

A bar chart showing the result of a third comparative test performed with the biostimulant agent according to the invention.

FIG. 4:

A bar chart showing the result of a fourth comparative test performed with the biostimulant agent according to the invention.

FIG. 5:

A bar chart showing the result of a fifth comparative test performed with the biostimulant agent according to the invention.

DESCRIPTION OF PREFERRED EMBODIMENTS

The invention is described in more detail below with reference to embodiments and experimental results. These embodiments are for explanatory purposes and not for the limitations on specific details.

Comparative Test 1: Effect of the Biostimulant Agent According to the Invention Compared to the Individual Components on Corn Plants at High Temperature Stress Under Field Conditions In a first field trial, the effect of the biostimulant agent according to the invention on the Growth of the leaf area of the corn hybrid DKC 3511 under heat stress was investigated. For comparison, the corresponding effect of the individual components protein hydrolysate and betaine was tested in parallel, each in the same amounts as contained in the biostimulant agent.

The field trial was conducted in June 2019 on soils with brittle black earth. The humus content was 3.2-3.4% and the depth of the humus layer was 60-70 cm. Soil pH was 6.2-6.6, alkaline hydrolyzed nitrogen content was 98-110 grams per kilogram, available phosphorus compounds content was 110-115 grams per kilogram, and available potassium content was 120-130 grams per kilogram. The average annual precipitation was 633 millimeters, whereas the precipitation in June was 87 millimeters. The average annual temperature was 7.4° C., the average temperature in June was 17.6° C., the average relative humidity was 76%, and the average relative humidity in June was 66%.

During the duration of the field trial, the treated plants were exposed to heat stress with daily temperatures exceeding 30° C. For the preparation of the biostimulant agent according to the invention, a liquid collagen hydrolysate with a free amino acid content of about 15% and a total amino acid content of about 50% was used as protein hydrolysate. A suitable hydrolysate is available, for example, under the name Protifert LMW 8 from the company SICIT (Arzignano, Italy). For the betaine proportion, a glycine betaine was used, which is commercially available, for example, as glycine betaine HCl (betaine hydrochloride) from the company Evonik Industries AG (Essen, Germany). A liquid mixture with a pH of 6.5 was then prepared from collagen hydrolysate and glycine betaine, in which the protein hydrolysate proportion and the betaine proportion were present in relation to one another in a mass ratio of 1:1 according to the invention. The biostimulant agent prepared in this way was used to treat a first group of plants in the trial field.

For comparison purposes, two other groups of plants located on the trial field were treated under the same experimental conditions with either the collagen hydrolysate only or the glycine betaine only, whereby the amount and concentration of the collagen hydrolysate and the glycine betaine in each of the comparative trials was the same as that of the biostimulant agent of the invention.

All three groups of plants were treated once with the corresponding solution at the same times and with the same quantities. In the treatment according to the invention, the equivalent of 1.15 liters of liquid protein hydrolysate and 0.68 kilograms of glycine betaine, corresponding to a mass ratio of 1:1, were uniformly applied to the plants per hectare of area using a spraying method. Correspondingly, in the comparative treatments, either only 1.15 liters of liquid protein hydrolysate per hectare of field area or only 0.68 kilograms of glycine betaine per hectare of field area were applied in each case.

To determine the biological effect of the different treatments, the leaf area of the plants (sum of leaf area from the third to the sixth leaf from the top in square meters per hectare of field area) was determined in each case before the start of the treatments and 10 days after the treatment. Thereby, the biological effect corresponds to the determined increase of the leaf area at the end of the study period in percent.

FIG. 1 shows the results of this comparative trial based on the biological effect in percent (y-axis) as a function of the respective treatment of the plants (x-axis).

The reference treatment with protein hydrolysate only resulted in a 6% increase in leaf area and the reference treatment with betaine only resulted in a 0.2% increase in leaf area. Accordingly, for the combined application of protein hydrolysate and betaine, the individual effects of the two treatments would have been expected to add up to a total leaf area increase of 6.2%.

In fact, however, with the combination of protein hydrolysate and betaine according to the invention, a 5.8% higher increase in leaf area (indicated by the black part of the bar in FIG. 1) of 12.0% in total was achieved. In relation to the aggregated. individual effects, this corresponds to an increase in the biological effect of more than 90%.

Such a superadditive or synergistic effect of the biostimulant agent according to the invention and the associated added value of the invention for the performance and economic efficiency of methods for treating plant or seed, respectively, could not have been expected from the point of view of those skilled in the art.

Comparative Test 2: Effect of the Biostimulant Agent According to the Invention in Comparison with the Individual Components on Sunflowers at High Temperature Stress Under Field Conditions Since it is known that the biostimulatory effect can vary depending on the plant species, the effect of the biostimulant agent according to the invention on the growth of the leaf area of the sunflower hybrid SI Diamantis (Syngenta, Basel, Switzerland) under heat stress with daily temperatures above 30° C. was investigated in another field trial. In all other aspects, the experimental conditions corresponded to those from the comparative test 1.

Figure 2:
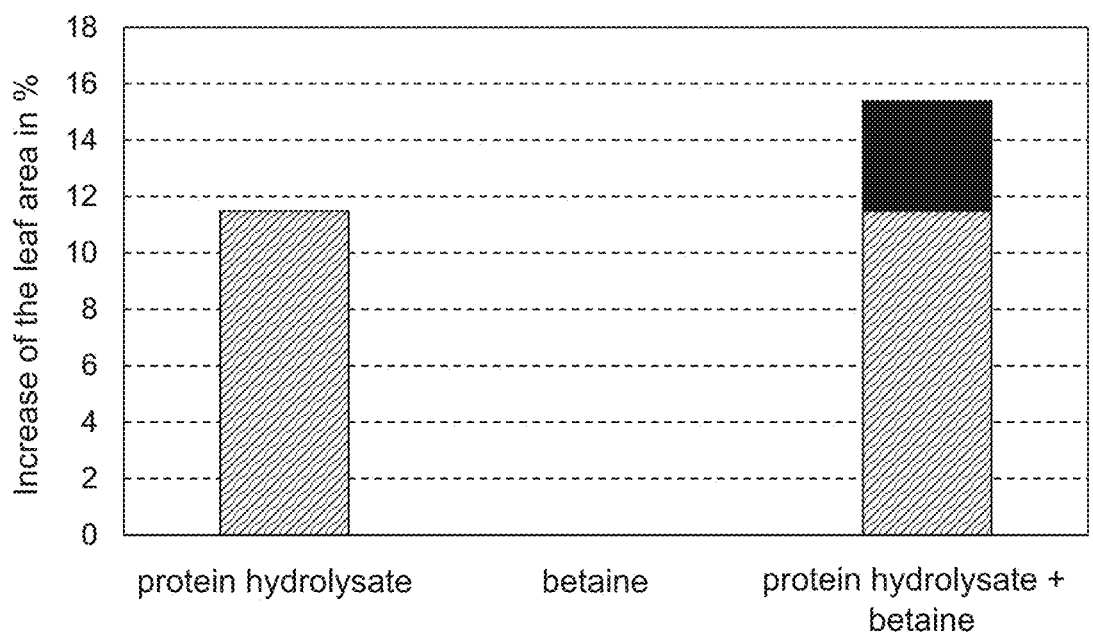
FIG. 2 shows a bar chart showing the result of a second comparative test performed with the biostimulant agent according to the invention.

The results of this comparative test are shown in FIG. 2 on the basis of the biological effect in % (y-axis) as a function of the respective treatment of the plants (x-axis). The reference treatment with protein hydrolysate only led here to an increase in leaf area of 11.48%. For the reference treatment with betaine only, no increase in leaf area was observed at all under the heat stress. In contrast, treatment of the plants with the biostimulant agent according to the invention resulted in an increase in leaf area of 15.38%, which was 3.9% higher than the sum of the individual effects (indicated by the black part of the bar in FIG. 2). In relation to the aggregated individual effects, this corresponds to an increase in the biological effect of more than 30%.

These results show that the beneficial synergistic effect of the biostimulant agent according to the invention occurs in different plant species.

Comparative Test 3: Effect of the Biostimulant Agent According to the Invention Compared to the Individual Components on Soybean plants at High Temperature Stress Under Field Conditions Finally, in another field trial, the combinatorial effect of the biostimulant agent according to the invention was verified based on the increase in leaf area of soybean var. Niagara (Syngenta, Easel, Switzerland) under heat stress.

The experimental conditions were again the same as those in comparative test 1, whereas the total leaf area was determined using the third to sixth leaf from the top of the soybean plants.

Figure 3:
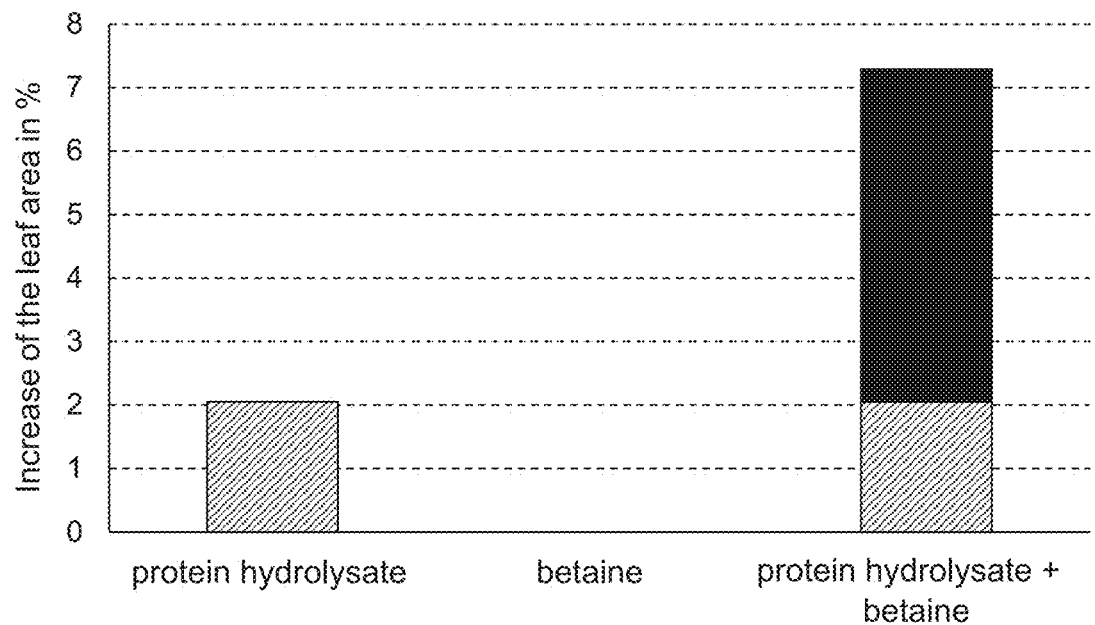
FIG. 3 shows a bar chart showing the result of a third comparative test performed with the biostimulant agent according to the invention.

FIG. 3 shows the results of this comparative test. The bar chart again shows the biological effect in % (y-axis) as a function of the respective treatment of the soybean plants (x-axis). In the plants treated with protein hydrolysate only, an increase in leaf area of 2.05% was observed. Under the reference treatment with betaine only, no increase in leaf area was observed at all. Those plants treated with the biostimulant agent according to the invention showed a 5.24% increase in leaf area (indicated by the black part of the bar in FIG. 2), compared to the summed individual effects, which amounted to a total of 7.29%. In relation to the aggregated individual effects, this corresponds to an increase in biological effect of more than 200%.

These results demonstrate that the surprising synergistic effect. of the combination of protein hydrolysate and betaine according to the invention is also beneficial for stress treatment of soybean and illustrates a universal applicability of the biostimulant agent according to the invention for the treatment of plants and seeds.

Comparative Test 4: Effect of the Biostimulant Agent According to the Invention on Corn Plants Under Drought Stress Using Different Mass Ratios of Protein Hydrolysate Proportion and Betaine Proportion in Relation to one Another in Climatic Chamber Experiments In climate chamber experiments, the effect of the biostimulant agent according to the invention using different mass ratios of the protein hydrolysate proportion and the betaine proportion in relation to one another on the chlorophyll content of the ZEAMX Zea corn variant DKC3730 under drought stress was investigated. For comparison, the chlorophyll content of the untreated—that means not treated with the biostimulant agent according to the invention—ZEAMX Zea corn variant DKC3730 was tested in parallel under drought stress as well as without induction of drought stress.

The climatic chamber experiments were carried out on soils from sandy field soil. The humus content of the soil was 4.1%. The pH of the soil was 5.2. The soil had a phosphorus content of 17 mg, a potassium content of 10 mg and a magnesium content of 8 mg per 100 g, respectively. Water content was maintained at 70% of the maximum water capacity of the soil until drought stress was induced. Soil temperature was 20° C. throughout the entire duration of the experiments.

For the preparation of the biostimulant agent according to the invention, a liquid collagen hydrolysate commercially available, for example, under the designation Protifert LMW 9 from the company SICIT (Arzignano, Italy) was used as the protein hydrolysate. For the betaine proportion, a betaine-containing molasses from sugar beets, commercially available, for example, from the company AGRANA (Vienna, Austria), was used. Four liquid mixtures were prepared from the collagen hydrolysate and the betaine-containing molasses from sugar beets, in which the protein hydrolysate proportion and the betaine proportion were present in relation to one another in a mass ratio of 4:1, 3:1, 1:5 and 1:10, respectively, according to the invention. The four biostimulant agents according to the invention prepared in this way were each used to treat a group of plants in the climate chamber experiments. The respective biostimulant agent according to the invention was uniformly applied to each of the plant groups by means of a spraying process.

In addition to these four plant groups treated with the biostimulant agents according to the invention, two other untreated plant groups were used in the climatic chamber experiments for comparison purposes.

Drought stress was induced in the four plant groups treated with the biostimulant agents according to the invention and in one of the two untreated plant groups by lowering the water content of the respective soils from 70% of the maximum water capacity to 50% four days after treatment with the biostimulant agents according to the invention and maintaining it at this lowered level. In contrast, for the further untreated group of plants, the water content of the soil was maintained at 70% of the maximum water capacity for comparison purposes and thus no drought stress was induced.

For the four groups of plants treated with the biostimulant agents according to the invention, the treatment was repeated 2 days after induction with the same biostimulant agents according to the invention that had already been used previously in each case.

To determine the biological effect of the different treatments, 14 days after this second application of the biostimulant agents according to the invention, the chlorophyll content was determined in all 6 plant groups using a SPAD-502 meter. The biological effect here equals the determined increase in chlorophyll content at the end of the study period relative to the untreated reference plant group exposed to drought stress, expressed in percentage.

Figure 4:
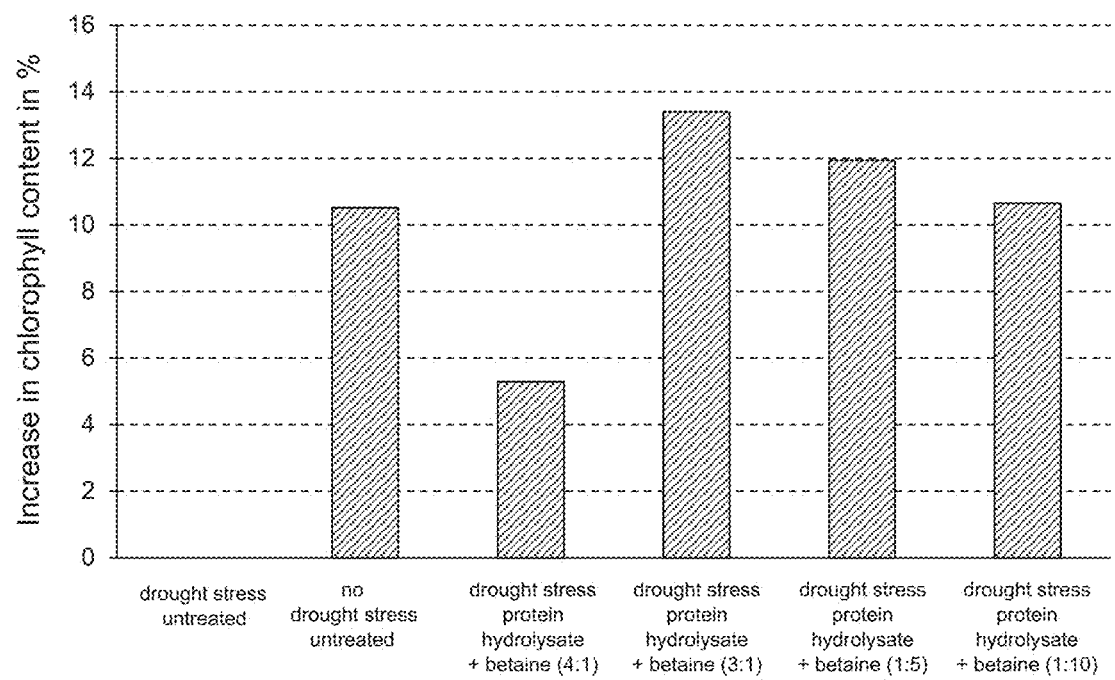
FIG. 4 shows a bar chart showing the result of a fourth comparative test performed with the biostimulant agent according to the invention.

FIG. 4 shows the results of this comparative test based on the biological effect in percent (y-axis) as a function of the respective treatment of the plants (x-axis)

Compared to the untreated plant group exposed to drought stress, the untreated plant group not exposed to drought stress showed an increase in chlorophyll content of 10.52%. The plant groups treated with the biostimulant agent according to the invention and exposed to drought stress also all showed an increase in chlorophyll content, namely 5.29% at a mass ratio of protein hydrolysate proportion and betaine proportion in relation to one another of 4:1 according to the invention, 13.4% at a mass ratio of 3:1 according to the invention, 11.94% at a mass ratio of 1:5 according to the invention and 10.65% at a mass ratio of 1:10 according to the invention.

In particular, for the groups of plants treated with the biostimulant agents according to the invention in a mass ratio of protein hydrolysate proportion and betaine proportion of 3:1, 1:5 and 1:10, respectively, the determined increase in chlorophyll content was at least equal to that of the untreated group of plants not exposed to drought stress. Thus, treatment with these biostimulant agents according to the invention completely compensated for the negative effect on chlorophyll content normally exerted on the plants by drought stress.

The comparative test shown in FIG. 4 illustrates that the biostimulant agent according to the invention has a positive biological effect on the plants during drought stress at all the mass ratios of protein hydrolysate proportion and betaine proportion to one another used. In this respect, the beneficial synergistic effect of protein hydrolysate and betaine is particularly pronounced at mass ratios of protein hydrolysate proportion and betaine proportion to one another according to the invention of 3:1 to 1:10 and 3:1 to 1:5, respectively, which manifested itself in a surprising doubling of the increase in chlorophyll content compared with the mass ratio of 4:1.

Comparative Test 5: Effect of the Biostimulant Agent According to the Invention on Corn Plants Under Drought Stress Using different Mass Ratios of Protein Hydrolysate Proportion and Betaine Proportion to one Another in Climatic Chamber Experiments In comparative test 4, a particularly positive biological effect on the plants under drought stress was shown when the protein hydrolysate proportion and betaine proportion in the biostimulant agents according to the invention were present in a mass ratio of at most 3:1 to one another in accordance with the invention. Although a positive biological effect of the biostimulant agent according to the invention was also observed with a higher protein hydrolysate proportion, e.g. in the mass ratio of 4:1, the observed increase in chlorophyll content was lower by a factor of about 2.5 compared with a biostimulant agent with a higher betaine proportion, e.g. in the mass ratio of protein hydrolysate proportion and betaine proportion to one another of 3:1 according to the invention.

In a further climatic chamber experiment, therefore, the biological effect of these two mass ratios according to the invention was compared once again. For this purpose, two liquid mixtures were prepared from the collagen hydrolysate and the betaine-containing molasses from sugar beets, in which the protein hydrolysate proportion and the betaine proportion were present in a mass ratio to one another according to the invention of 4:1 and 3:1, respectively. The two biostimulant agents according to the invention prepared in this way were each used to treat a group of plants. In all other aspects, all experimental conditions including the reference plant groups—with the exception of the time of the final chlorophyll content determination—correspond to comparative test 4. In this case, the final chlorophyll content determination was performed 21 days after the second application to the treated plant Groups with the respective biostimulant agents according to the invention.

The biological effect again corresponds to the determined increase in chlorophyll content at the end of the study period relative to the untreated reference plant group exposed to drought stress in percent.

Figure 5:
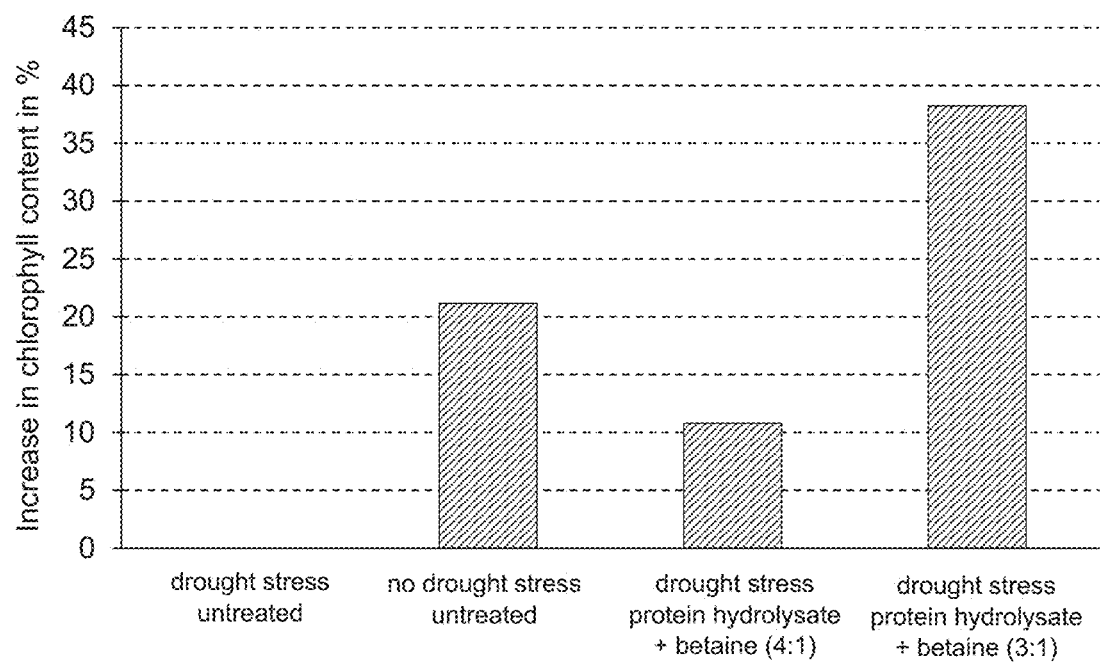
FIG. 5 shows a bar chart showing the result of a fifth comparative test performed with the biostimulant agent according to the invention.

FIG. 5 shows the results of this comparative test by means of the biological effect in percent (y-axis) as a dependence of the respective treatment of the plants (x-axis).

Compared to the untreated plant group exposed to drought stress, the untreated plant group not exposed to drought stress showed an increase in chlorophyll content of 21.16%. The plant groups treated with the biostimulant agent according to the invention and exposed to drought stress also both showed an increase in chlorophyll content. However, as in comparative test 4, this was significantly higher in the plant group treated with the biostimulant agent with a mass ratio according to the invention of protein hydrolysate proportion and betaine proportion to one another of 3:1, compared to the plant group treated with the biostimulant agent with a mass ratio according to the invention of 4:1. When protein hydrolysate proportion and betaine proportion were used in a mass ratio of 3:1 to one another, the increase in chlorophyll content was 38.23% compared to 10.18% when a mass ratio of 4:1 according to the invention was used, corresponding to an additional 375% improvement in the observed biological effect. Such an additional improvement of the biological effect from a mass ratio of at most 3:1 according to the invention could not have been expected from a skilled expert's point of view.

Of course, the embodiments discussed in the specific description are only illustrative embodiments of the present invention. The person skilled in the art is provided with a wide range of possible variations in light of the present disclosure.

The invention claimed is:

1. A biostimulant composition for treating plants and/or plant seed, comprising:
   a protein hydrolysate proportion; and
   a betaine proportion, wherein the protein hydrolysate proportion and the betaine proportion are present in relation to one another in a mass ratio of 3:1 to 1:10 in the biostimulant composition.

2. The biostimulant composition according to claim 1, wherein the protein hydrolysate proportion and the betaine proportion are present in relation to one another in a mass ratio of 3:1 to 1:5 in the biostimulant composition.

3. The biostimulant composition according to claim 2, wherein the protein hydrolysate proportion and the betaine proportion are present in relation to one another in a mass ratio of 1:1 to 1:3 in the biostimulant composition.

4. The biostimulant composition according to claim 1, wherein the betaine proportion comprises or consists of glycine betaine.

5. The biostimulant composition according to claim 1, wherein the protein hydrolysate proportion at least in part comprises a hydrolysis product of collagen.

6. The biostimulant composition according to claim 1, wherein the biostimulant composition additionally comprises at least one additive selected from a fungicide, an insecticide, a herbicide and/or a plant-specific growth regulator.

7. The biostimulant composition according to claim 1, wherein the biostimulant composition comprises a solvent.

8. The biostimulant composition according to claim 1, wherein the protein hydrolysate proportion and the betaine proportion form together a total proportion from 0.01 weight percent to 10 weight percent of the biostimulant composition and/or are contained together in a concentration from 0.1 gram per liter to 100 grams per liter in the biostimulant composition.

9. The biostimulant composition according to claim 1, wherein the biostimulant composition additionally comprises a wetting agent which forms a wetting agent proportion of 0.01 weight percent to 5 weight percent of the biostimulant composition and/or is contained in the biostimulant composition in a concentration of 0.01 volume percent to 5 volume percent.

10. A method for treatment of plants and/or plant seed, with the biostimulant composition according to claim 1.

11. The method according to claim 10, wherein the treatment comprises contacting at least one part of the plants and/or the plant seeds with the biostimulant composition.

12. The method according to claim 11, wherein the plants and/or plant seed are brought into contact with the biostimulant composition for at least 10 hours and/or for at most 14 hours.

13. The method according to claim 10, wherein the treatment is performed before a stress event for the plants and/or plant seed.

14. The method according to claim 13, wherein the stress event is a cold stress, a heat stress, a drought stress, a salt stress, and/or a herbicide, fungicide, and/or insecticide treatment.

15. The method according to claim 13, wherein the treatment is performed at least 24 hours and at most 48 hours before the stress event.

16. The method according to claim 10, wherein per hectare of a treatment area comprising the plants and/or the plant seed, a mass of the protein hydrolysate proportion together with a mass of the betaine proportion in the biostimulant composition is equal to 1 gram to 5000 grams and/or the biostimulant composition is applied in a total volume of 50 to 1500 liters.

* * * * *